United States Patent
Slegers et al.

(10) Patent No.: US 11,129,249 B2
(45) Date of Patent: Sep. 21, 2021

(54) METHOD AND APPARATUS FOR CONTROLLING A LIGHTING SYSTEM

(71) Applicant: SIGNIFY HOLDING B.V., Eindhoven (NL)

(72) Inventors: Walter Jeroen Slegers, Eindhoven (NL); Dzmitry Viktorovich Aliakseyeu, Eindhoven (NL); Remco Magielse, Tilburg (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/966,607

(22) PCT Filed: Jan. 21, 2019

(86) PCT No.: PCT/EP2019/051322
§ 371 (c)(1),
(2) Date: Jul. 31, 2020

(87) PCT Pub. No.: WO2019/149548
PCT Pub. Date: Aug. 8, 2019

(65) Prior Publication Data
US 2021/0084732 A1    Mar. 18, 2021

(30) Foreign Application Priority Data

Jan. 31, 2018 (EP) .................................... 18154361

(51) Int. Cl.
*H05B 47/155*   (2020.01)
*H05B 47/17*    (2020.01)
(Continued)

(52) U.S. Cl.
CPC ........... *H05B 45/10* (2020.01); *H05B 47/115* (2020.01); *H05B 47/155* (2020.01); *H05B 47/17* (2020.01); *H05B 47/19* (2020.01)

(58) Field of Classification Search
CPC ...... H05B 47/10; H05B 47/17; H05B 47/105; H05B 47/175; H05B 47/155; H05B 47/19; H05B 45/10
See application file for complete search history.

(56) References Cited

U.S. PATENT DOCUMENTS 8,368,310 B1 * 2/2013 Roosli ................. H04L 12/2827
                                                              315/152
8,640,038 B1    1/2014 Reeser et al.
(Continued)

FOREIGN PATENT DOCUMENTS

EP    3099143 B1    3/2020

*Primary Examiner* — Thai Pham (57) ABSTRACT

A method of controlling a lighting system comprising one or more illumination sources each controllable to emit respective illumination for illuminating an environment, the method comprising: causing a user interface of a user device to output an indication of one or more past lighting events associated with a set of the one or more illumination sources, wherein the indication comprises: one or more attributes of the illumination associated with a respective lighting event from the one or more past lighting events, and a trigger which led to the respective lighting event from the one or more past lighting events.

12 Claims, 4 Drawing Sheets

(51) Int. Cl.
*H05B 47/19* (2020.01)
*H05B 45/10* (2020.01)
*H05B 47/115* (2020.01)

(56) References Cited

U.S. PATENT DOCUMENTS

| | | |
|---|---|---|
| 10,856,393 B2* | 12/2020 | Chema .................. H05B 47/11 |
| 2007/0043541 A1 | 2/2007 | Cleland et al. |
| 2009/0002981 A1* | 1/2009 | Knibbe .................... G01S 5/14 |
| | | 362/233 |
| 2011/0115413 A1 | 5/2011 | Erickson et al. |
| 2014/0257573 A1 | 9/2014 | Van De Sluis et al. |
| 2014/0351733 A1 | 11/2014 | Soheili |
| 2015/0382436 A1* | 12/2015 | Kelly .................. H05B 47/105 |
| | | 315/131 |
| 2016/0277203 A1 | 9/2016 | Jin et al. |
| 2016/0278187 A1 | 9/2016 | Amer et al. |
| 2017/0150576 A1* | 5/2017 | Thijssen ............. H05B 47/105 |
| 2017/0257929 A1 | 9/2017 | Harada et al. |
| 2019/0141823 A1* | 5/2019 | Mason ............. H04M 1/72412 |
| 2019/0289698 A1* | 9/2019 | Rozendaal ........... H05B 47/175 |

* cited by examiner

METHOD AND APPARATUS FOR CONTROLLING A LIGHTING SYSTEM

CROSS-REFERENCE TO PRIOR APPLICATIONS

This application is the U.S. National Phase application under 35 U.S.C. § 371 of International Application No. PCT/EP2019/051322, filed on Jan. 21, 2019, which claims the benefit of European Patent Application No. 18154361.2, filed on Jan. 31, 2018. These applications are hereby incorporated by reference herein.

TECHNICAL FIELD

The present disclosure relates to a method and apparatus for controlling a lighting system.

BACKGROUND

Connected lighting refers to a system of one or more luminaires (or illumination sources) which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as Zigbee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

A connected lighting system may produce unexpected behavior compared to traditional wired on-off or dimmer circuits. For example, each luminaire or illumination source may implement a variety of respective lighting events which can be triggered by a time-of-day, a motion sensor, a lighting scene activation, a pre-configured rule, etc. The user may lose track of which trigger is associated with each lighting event. Furthermore, it is usually possible for several users to implement their own rules within the system, further adding to the uncertainty that may arise when a particular lighting event occurs.

SUMMARY

According to a first aspect disclosed herein, there is provided a method of controlling a lighting system comprising one or more illumination sources each controllable to emit respective illumination for illuminating an environment, the method comprising: causing a user interface of a user device to output an indication of one or more past lighting events associated with a set of the one or more illumination sources, wherein the indication comprises: one or more attributes of the illumination associated with a respective lighting event from the one or more past lighting events, and a trigger which led to the respective lighting event from the one or more past lighting events.

In an example, the method comprises determining that a past lighting event has occurred, determining an associated trigger of the past lighting event, storing the determined past lighting event and associated trigger in a memory, accessing the memory to retrieve the past lighting event and associated trigger, and outputting, by the user device, the retrieved past lighting event and associated trigger.

In an example, the method comprises enabling a user via the user device to modify at least one of: (i) the one or more attributes associated with the respective lighting events, (ii) the trigger which led to the respective lighting event occurring, (iii) a behavior mapping a trigger to a respective lighting event, and (iv) a permission associated with said behavior or a respective trigger.

In an example, modifying the trigger which led to the respective lighting event comprises blocking and/or disabling the ability for the trigger to control the one or more illumination sources associated with the respective lighting event.

In an example, causing the user device to output an indication of one or more past lighting events comprises causing a display screen of the user device to display the sequence of the one or more past lighting events.

In an example, causing the user device to output an indication of one or more past lighting events comprises causing a speaker of the user device to output the sequence of the one or more past lighting events.

In an example, the method comprises outputting the indication of the one or more past lighting events as a chronologically ordered sequence of past lighting events forming a graphical timeline displayed on the display screen of the user device.

In an example, the sequence comprises a date and/or time associated with each respective past lighting event.

In an example, the indication of past lighting events is automatically updated as lighting events associated with the set of the one or more illumination sources (104) occur.

In an example, the one or more past lighting events comprise at least one user initiated lighting event.

Figure 4:
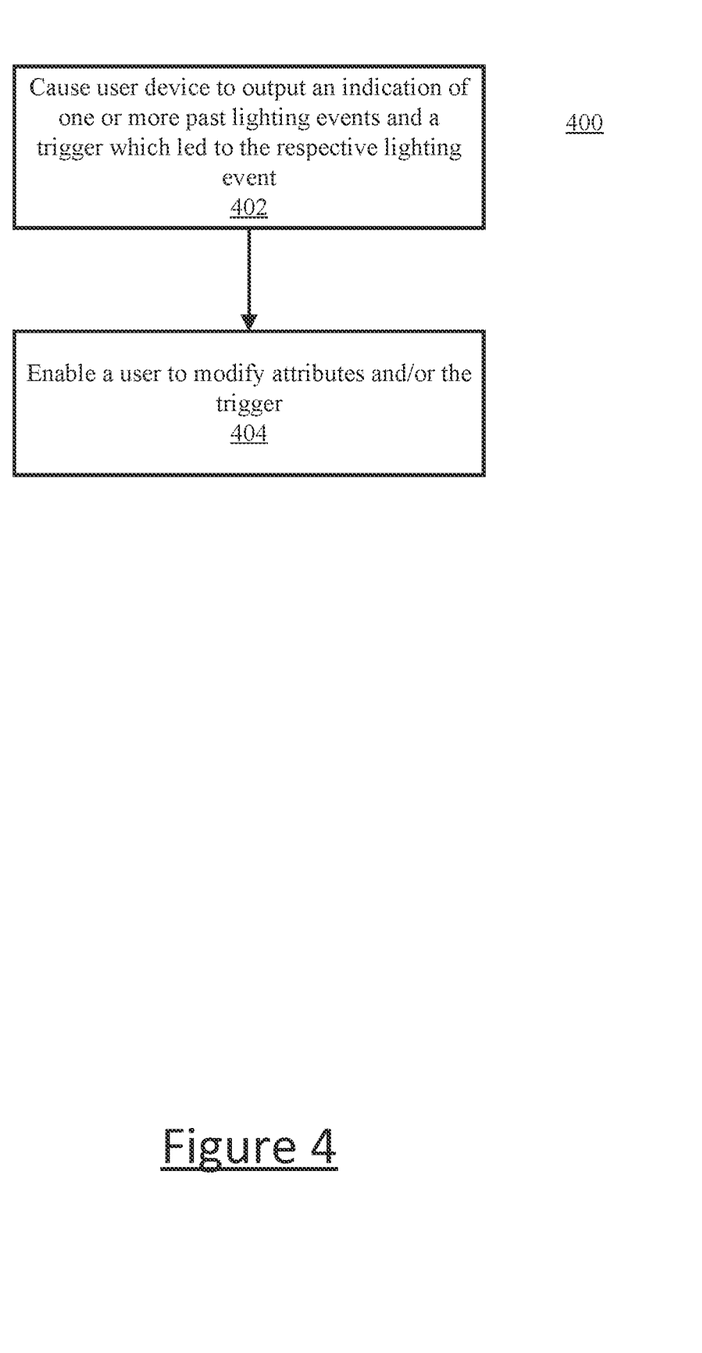
FIG. 4 shows schematically an example of a block/flow diagram of a method of controlling a lighting system.

According to a second aspect disclosed herein, with reference to FIG. 4, there is provided a method 400 of controlling a lighting system comprising one or more illumination sources each controllable to emit respective illumination for illuminating an environment, the method comprising: causing, at step 402, a display screen of the user device to display a chronologically ordered sequence of past lighting events associated with a set of the one or more illumination sources, wherein the chronologically ordered sequence comprises: one or more attributes of the illumination associated with a respective lighting event from the chronologically ordered sequence of lighting events, and a trigger responsible for causing the respective lighting event from the chronologically ordered sequence of lighting events.

In an example, the method comprises enabling, at step 404, a user via the user device to modify at least one of: (i) the one or more attributes associated with the respective displayed lighting events, and (ii) the trigger responsible for causing the respective lighting event to occur.

In an example, the set of the one or more illumination sources is selected by a user via the user device.

In an example, the selecting of the set of the one or more illumination sources comprises selecting, via the user device, one or more lighting controls responsible for controlling the one or more illumination sources.

In an example, the set of the one or more illumination sources is selected based on a proximity between the user device and at least one of: (i) the one or more illumination sources and (ii) the lighting control responsible for controlling the one or more illumination sources.

In an example, the lighting control responsible for controlling the one or more illumination sources is the lighting control which initiated the sequence of events which led to controlling the one or more illumination sources.

In an example, the method comprises displaying the chronologically ordered sequence of past lighting events as a graphical timeline.

In an example, each past lighting event is represented as a respective graphical element on the graphical timeline, and the enabling of the user to select one or more lighting events from the displayed sequence of lighting events comprises enabling the user to perform said selection by selecting one or more of the respective graphical elements.

For example, the user may select a graphical element by touching the element on a touch screen of a user device or by clicking on the element on a point-and-click interface.

In an example, the chronologically ordered sequence comprises a date and/or time associated with each respective lighting event.

In an example, the chronologically ordered sequence of past lighting events is automatically updated as lighting events associated with the set of the one or more illumination sources occur.

In an example, enabling the user via the user device to perform said modifying comprises enabling the user to select one or more lighting events from the displayed sequence of lighting events.

In an example, enabling the user via the user device to modify the trigger responsible for causing the respective lighting event to occur comprises preventing the trigger from causing the respective lighting event to occur in the future.

In an example, the method comprises storing a sequence of past lighting events associated with the set of the one or more illumination sources.

In an example, the method comprises deleting one or more lighting events from the stored sequence of past lighting events.

In an example, the set of the one or more illumination sources comprises at least one of: (i) a single illumination source of the one or more illumination sources, (ii) a plurality of the one or more illumination sources, or (ii) all of the one or more illumination sources in the lighting system.

According to a third aspect disclosed herein, there is provided an apparatus for controlling a lighting system (200) comprising one or more illumination sources, each controllable to emit respective illumination for illuminating an environment (100), the apparatus comprising: a user interface configured to output an indication of one or more past lighting events associated with a set of the one or more illumination sources, wherein the indication comprises: one or more attributes of the illumination associated with a respective lighting event from the one or more past lighting events, and a trigger which led to the respective lighting event from the one or more past lighting events.

According to a fourth aspect disclosed herein, there is provided an apparatus for controlling a lighting system comprising one or more illumination sources, each controllable to emit respective illumination for illuminating an environment, the apparatus comprising:
a display screen configured to display a chronologically ordered sequence of past lighting events associated with a set of the one or more illumination sources, wherein the chronologically ordered sequence comprises: one or more attributes of the illumination associated with a respective lighting event from the chronologically ordered sequence of lighting events, and a trigger responsible for causing the respective lighting event from the chronologically ordered sequence of lighting events.

According to a fifth aspect disclosed herein, there is provided a computer program product comprising code embodied on computer-readable storage and configured so as when run on one or more processing units of a device to perform operations in accordance with any method disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

A lighting system can allow different services and applications to control the illumination sources within the system. Some of the services and applications may cause the illumination sources to behave in a way that is confusing to a user of the lighting system. For example, application A may cause a set of illumination sources to emit illumination with characteristic A (e.g. bright lighting) in response to a condition being met (e.g. a time of day), whilst application B may cause the set of illumination sources to emit illumination with characteristic B (dim lighting) in response to the same trigger. Furthermore, different users may use the same services and applications to control the illumination sources within the lighting system. A user may be unaware of a setting programmed by another user. A user may also forget a setting that they have previously configured by an application. All of the above scenarios may cause confusion for the user if a lighting event occurs and the user does not know why the lighting event has been triggered.

Examples described herein provide a quick and user friendly way of providing information about what happened to an illumination source (e.g. why a lamp turned on) and why it happened (e.g. because an application has been set to turn the lamp on at 6 pm). This can enable the user to better understand the behavior of the lighting system and to optionally adjust the behavior. One way of providing this information is on a user interface of a device such as a smart phone. The user interface, which may be a display screen, can be controlled to show an ordered sequence of lighting events that have previously taken place. The user can then see from the sequence what has happened at different points in time to understand the previous and current states of the lighting system. The user may optionally change an attribute of the lighting event (e.g. what happened) and/or a trigger of the lighting event (e.g. why it happened).

Figure 1:
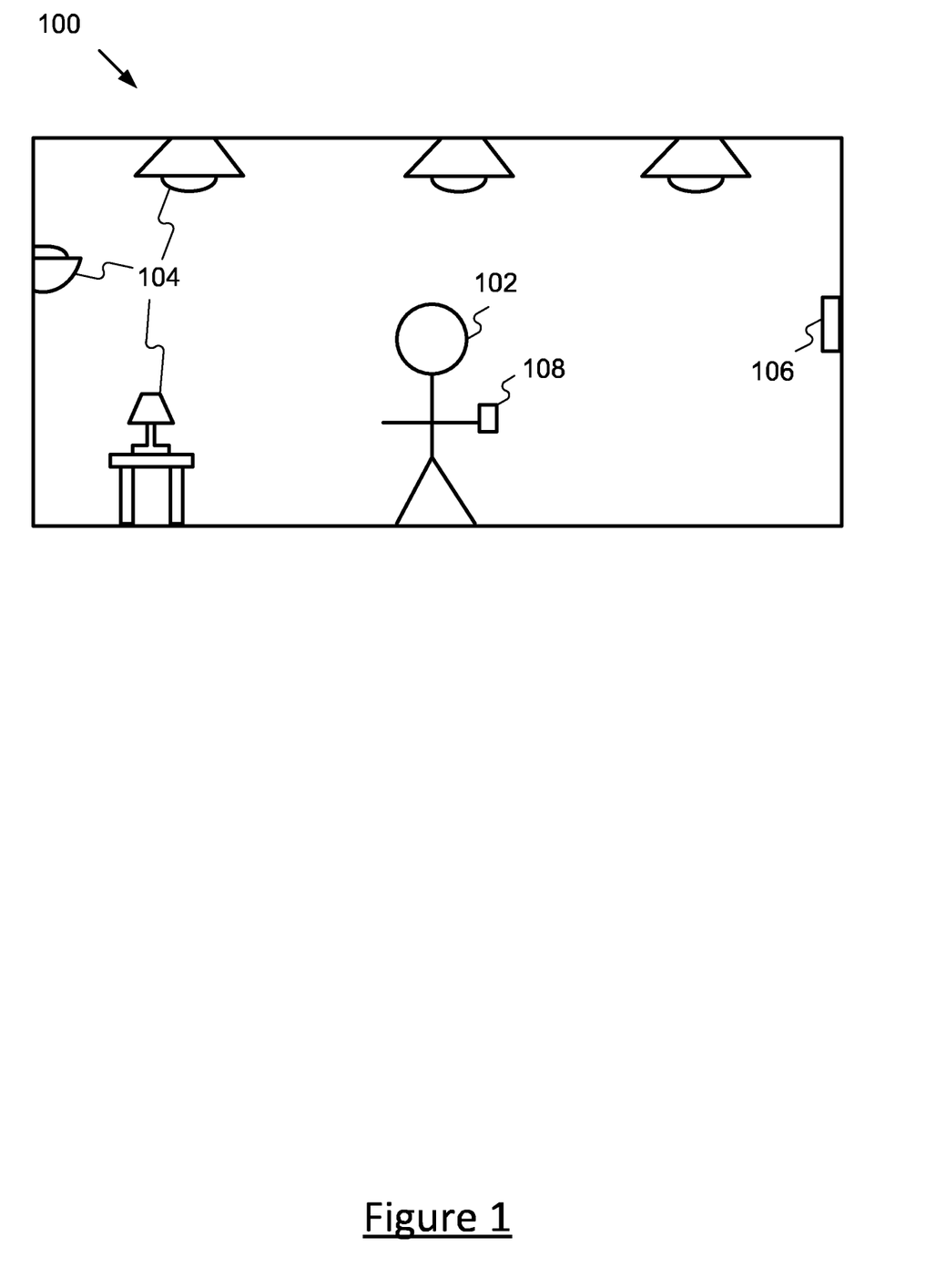
FIG. 1 shows schematically an example of an environment comprising a lighting system.

FIG. 1 illustrates an example environment 100 in which embodiments disclosed herein may be employed. The environment 100 is a space which may be occupied by one or more users 102. The environment 100 may take the form of an indoor space such as one or more rooms of a home, office or other building; an outdoor space such as a garden or park; a partially covered space such as a gazebo; or a combination of such spaces such as a campus or stadium or other public place that has both indoor and outdoor spaces.

The environment 100 is equipped with one or more illumination sources 104 installed or otherwise disposed at different locations throughout the environment 100. An illumination source 104 may refer to any kind of illumination device for illuminating an environment 100 or part of the environment 100 occupied by a user 102, whether providing for example ambient lighting or specific task lighting. Each of the illumination sources 104 may take any of a variety of possible forms, such as a ceiling or wall mounted luminaire, a free-standing floor or table illumination source, or a less traditional form such as an illumination source embedded in a surface or an item of furniture. The different illumination sources 104 in the environment 100 need not take the same form as one another. Whatever form it takes, each illumination source 104 comprises at least one lamp (illumination element) and any associated housing, socket and/or support. Examples of suitable lamps include LED-based lamps, or traditional filament bulbs or gas discharge lamps.

Whilst not shown in FIG. 1, in some scenarios the environment 100 may be divided into a plurality of different zones or localities, such as different rooms, each illuminated by a different respective subset of one or more of the illumination sources 104. For example, a zone may correspond to e.g. a living room, kitchen, hall, and bathroom, multiple bedrooms in a home; or multiple offices, hallways, a reception and a canteen or breakroom in an office building.

The environment 100 may also be equipped with one or more lighting controls 106 disposed at one or more locations throughout the environment 100. For example, each zone or locality may comprise a single respective control apparatus 106. Alternatively, each zone or locality may comprise more than one respective control apparatus 106. Each lighting controls 106 may take the form of a stand-alone lighting control 106 such as a smart light switch or an actuator device such as a button, switch, dial or slider device, or wall panel comprising one or more buttons, switches, dials and/or sliders etc.

Alternatively or additionally a lighting control 106 may be integrated in another user device such as a mobile user terminal such as a smartphone or tablet, or even a wearable device that can be worn about the user's person. Such a user terminal may be installed with for example a suitable lighting control "app". A lighting control 106 may be configured to receive voice commands to control different attributes of the illumination sources 104. For example, a user device may receive and interpret a voice command and use the interpreted voice command to control (either directly or via a central lighting bridge) one or more illumination sources 104. As another example, one or more of the lighting controls may comprise a sensor for automatically controlling the lighting, such as a motion sensor or a daylight sensor. The lighting control 106 may be mains powered and/or battery powered and/or use energy-harvesting techniques to supply its energy. The system is configured such that events from a lighting control 106 can change the illumination emitted by one or more illumination sources 104. This may include switching the illumination sources 104 on/off, controlling the color of the illumination, controlling the brightness or dimming level, controlling a time-varying effect of the illumination, etc.

The environment 100 also contains at least user device 108 having a user interface for outputting information to a user, as will be described in detail in relation to FIG. 2. The user device 108 could be the same device as one of the control devices 106, or it could be a separate device.

Figure 2:
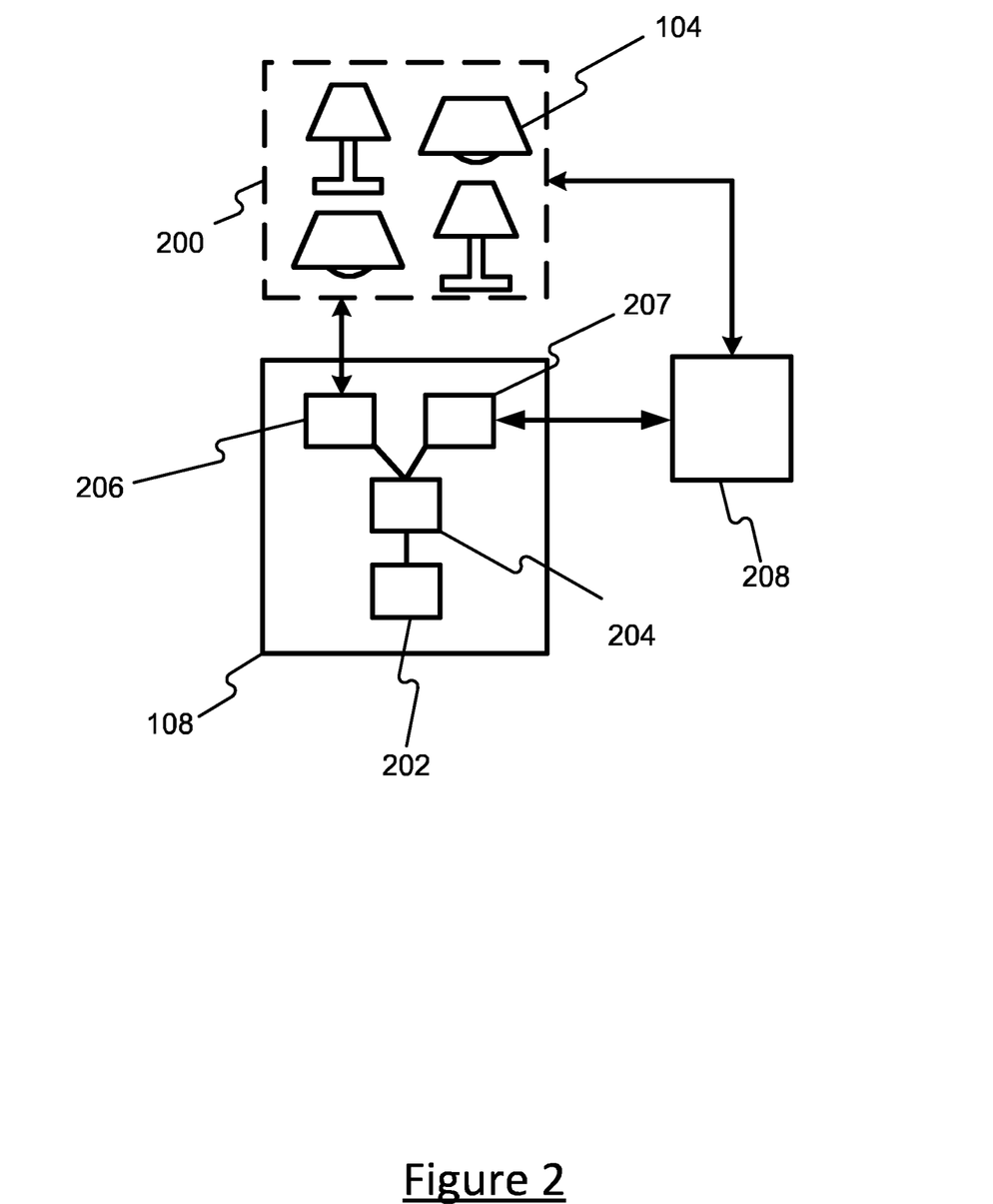
FIG. 2 shows schematically an example block diagram of an apparatus for controlling a lighting system.

FIG. 2 illustrates an example of a user device 108 for controlling one or more illumination sources 104 of a lighting system 200. The user device 108 has a user interface 202 to receive an input from the user 102 and operatively coupled to a controller 204. The user interface 202 has a display in the form of a screen and some arrangement for receiving inputs from the user 102. For example, the user interface 202 may comprise a touch screen, or a point-and-click user interface comprising a mouse, track pad, or tracker ball or the like. Alternatively or additionally, the user interface 202 may comprise a dedicated actuator or control panel for receiving inputs.

The controller 204 of the user device 108 may also be coupled to one or more illumination sources 104 of the lighting system 200 via a wireless transceiver 206. The controller 204 can thereby control the lighting system 200 based on user inputs in order to adjust one or more aspects of the illumination emitted by the illumination sources 104, e.g. to turn one or more of the illumination sources 104 on or off, to dim the illumination level up or down, to adjust the color of the emitted illumination, to set a dynamic effect (e.g. varying in space and/or time), or to adjust any other aspects of the illumination that may be applicable to the illumination sources 104 within the environment 100.

The controller 204 may be coupled to a central bridge or server 208 via a transceiver 206, which may be a wireless transceiver, and may be configured to control one or more illumination sources 104 of the lighting system 200 by issuing commands to the central bridge or server 208. The transceiver 206 may communicate with the central bridge or server 208 via, for example, a Wi-Fi or Ethernet connection. Alternatively the controller 208 may be arranged to control one or more of the illumination sources 104 via a direct connection with the source(s). In another implementation, the user device 108 may be integrated into the central bridge or server 208. For example, the central bridge 208 may have a user interface 202 (such as a touchscreen) that is configured to receive user inputs for controlling the one or more illumination sources 104.

A (wireless) transceiver 207, which is operatively coupled to the controller 204 is configured to communicate with the lighting system 200, a lighting control 106 or a central bridge/server 208 via any suitable wireless medium. For example, the wireless transceiver 206 may be a radio transceiver for communicating via a radio channel (though other forms are not excluded, e.g. infrared transceiver). The wireless transceiver 207 and the transceiver 206 may communicate with their respective counterparts via the same or different techniques. Indeed, the wireless transceiver 207 may be combined with the transceiver 206. For example, only one transceiver may be required to communicate with all components of the lighting system 200. The wireless transceiver 206 may comprise for example a ZigBee, Bluetooth, Wi-Fi, Thread, JupiterMesh, Wi-SUN, 6LoWPAN, etc. interface for communicating with the illumination sources 104 and with the central bridge/server 208. Each illumination source 104 may be configured to be able to communicate over a wireless channel based on a medium other than visible light, preferably a radio channel (though the possibility of other media such as ultrasound or infrared are not excluded). For instance the radio channel may be based on the same radio access technology used by the wireless transceiver 206 (e.g. ZigBee, Bluetooth, Wi-Fi, Thread, JupiterMesh, Wi-SUN, 6LoWPAN, etc.). Alternatively, the wireless transceiver 206 may communicate over a local area network such as a WLAN or a wide area network, such as the internet. In the case of receiving commands direct from the user device 108, the illumination sources 104 may each comprise a receiver or transceiver. Alternatively, the illumination sources 104 may each comprise a wired connection, e.g. to communicate with a central bridge 208.

In examples described herein, a user device 108 is controlled to output (e.g. via a display screen or speaker(s) of the user device 108) a sequence of previous lighting events. The sequence (which may only have a single lighting event) may optionally be time ordered or chronological such that lighting events are shown in the order that they occurred. Lighting events are associated with a selection of the illumination sources 104 in the lighting system 200 and can include, for example, an attribute change of an illumination source 104 (e.g. switching on, a dimming level change, a color temperature change, a lighting scene). A lighting event can also include the operation of a lighting control 106 (e.g. operating a wall switch or activating a motion sensor). Whatever the lighting event is, the outputted sequence shows the attribute(s) associated with a particular lighting event and the trigger that either led to the lighting event, or that was (most likely) responsible for causing the event. The trigger may be, for example, an application or service programmed to control the illumination source(s) or a lighting control 106. The trigger may also show a rule or instruction implemented in the bridge after being configured by, e.g. a lighting "app". The set of illumination sources 104 can be a single illumination source 104, multiple illumination sources 104 (e.g. corresponding to a single zone or room) or all of the illumination sources 104.

An advantage of this is that the user 102 can visualize or hear a sequence of past lighting events to understand why the lighting system 200, or parts thereof (e.g. a specific room or illumination source 104), has behaved in a certain way and why the lighting system 200 is in its current state. This is particularly beneficial when multiple different triggers within the environment 100 are capable of controlling the lighting system 200 because the (chronological) sequence can allow the user 102 to quickly identify which of the multiple triggers may be responsible for an unexpected lighting event.

A trigger may also be originated from outside of the physical environment in which the one or more illumination sources are located. For example, a trigger may be a voice control system with a cloud internet connection to the lighting system.

In some examples, the past lighting event (or information pertaining to the lighting event such as date/time of the event) and the trigger responsible for the lighting event may be determined and stored in a memory of the user device 108, central bridge or server 208 or across a cloud service. For example, a past lighting event may be the bedroom lights being switched on, whilst the trigger may be a time of day, the bedroom lights being programmed (e.g. by an application) to switch on at that particular time of day. The stored lighting event and trigger may be accessed from memory and displayed on a display screen of the user device 108.

In some examples, the one or more past lighting events include one or more user initiated lighting events. For example, the user initiated lighting event may be a user pressing the button of a lighting control that is configured to control a set of one or more illumination sources, e.g. to switch a lamp on. In examples, the user initiated lighting events are unscheduled. For example, the unscheduled lighting event has not been previously programmed to occur at a given time.

Figure 3:
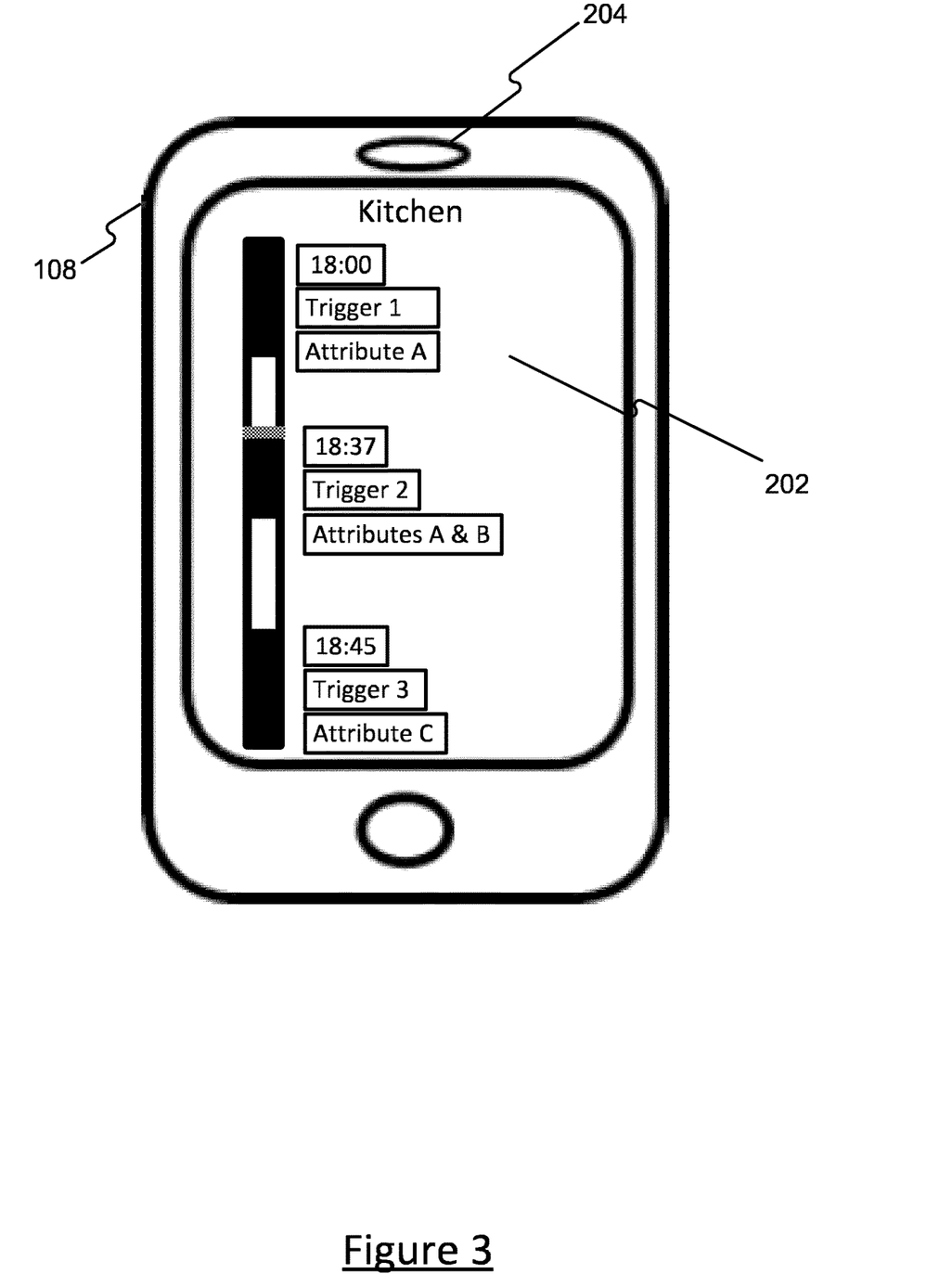
FIG. 3 shows schematically an example of an apparatus for controlling a lighting system.

FIG. 3 illustrates an example of a user device 108 with a display screen and a speaker 204 for displaying or playing out a chronologically ordered sequence of past lighting events associated with the kitchen's illumination source 104. For example, a lighting event is shown to have started at a time of 18:00 and was triggered by Trigger 1 (e.g. an application). The lighting event is characterized by Attribute A (e.g. emitting illumination with an "evening scene"). At 18:37, a second lighting event occurred. The illumination source 104 emitted bright illumination for one minute before dimming back to the previous setting. In this example, the Attributes A and B represent the bright light and the previous illumination respectively. The trigger, Trigger 2, was configured by an application that has been programmed to cause the kitchen's illumination source 104 to emit illumination of Attributes A and B in response to a bridge command which got an event from a lighting control 106 (e.g. a motion sensor) being activated. At 18:45, Trigger 3 (e.g. a third party cloud computing service) caused the illumination source 104 to emit illumination with a specific temperature and brightness to mimic a sunset (Attribute). In examples, the user interface 202 displaying the sequence (e.g. a chronologically ordered list or a timeline) can be a mobile application, or a web-page, etc.

As an additional feature, the user 102 can modify an attribute of a lighting event from the displayed sequence. For example, the user 102 may select a lighting event via the display screen (e.g. via a touch screen) or by issuing a voice command received by a microphone of the user interface 202 and processed by the controller 204. Whatever the selection method, the user 102 can adjust one or more attributes. For example, the user 102 may modify the lighting event such that the next time the lighting event occurs due to the same trigger, the illumination emitted by an illumination source 104 is different (e.g. brighter or dimmer). In another example, the attribute to be changed may be a duration for which the lighting event lasts. For example, if a trigger causes a set of illumination sources 104 to switch on in response to the activation of a motion sensor, instead of switching on for the original time period, the illumination sources 104 can be controlled to switch on for a different time period. An advantage of this feature is that the user 102 can quickly change a lighting event such that it does not occur in the same way in the future.

Alternatively or additionally, the user 102 can modify the trigger that caused a lighting event from the displayed sequence. For example, a trigger may be an application that is programmed to cause a particular event. The application, or its permissions, i.e. its ability to control certain aspects of the lighting system 200, may be modified so that, for example, it can no longer cause the same lighting event to happen in the future. For example, commands from the application in question may be blocked such that they can no longer control one or more illumination sources 104. In another example, the application (or its permissions, access rights, etc.) may be modified so that it can no longer control the particular set of illumination sources 104 associated with the lighting event. In yet another example, the application may be modified so that it can no longer control any of the illumination sources 104 in the lighting system 200. An advantage of this is that triggers can be disabled easily to prevent unwanted behavior occurring within the lighting system 200. For example, a trigger may be a third party application which causes unexpected behavior when controlling with the illumination sources 104. The third party application may be required to communicate with the central bridge or server 208 in order to control an illumination source 104. Modifying the trigger may involve preventing commands received at the central bridge 208 from controlling the illumination source 104.

In another example, the trigger may be a rule implemented by e.g. a service connected to the lighting system 200. The rule may cause a set of illumination sources 104 to emit illumination corresponding to a "sunset scene" at a certain time of day, e.g. at 7 pm. The user 102 may modify the rule (i.e. the trigger) such that the evening scene is activated at a different time of day, e.g. at 6 pm. If instead the trigger is a lighting control 106 such as a portable light switch with, for example, two buttons, the trigger may be one of the two buttons. The trigger may be modified such that it controls a different set of illumination sources 104 to the set of illumination sources 104 that it initially controlled. An advantage of this feature is that the effect of a trigger can be controlled to reflect the user's preferred operation of the trigger.

Where the past lighting event that has a dynamic effect (e.g. a time-varying lighting scene such as a beach scene), the lighting event is outputted, e.g. displayed in the sequence, as a single entry. That is, even if the attributes of the illumination sources may change after a subsequent lighting event occurs, an additional entry related to the dynamic effect will not be entered into the sequence. Instead, the past lighting event may display a start and finish time, a duration, etc.

Moreover, as mentioned above, a lighting event can include the operation of a lighting control 106 such as a dimmer switch. If a button of a lighting control 106 is pressed to increment an attribute of the illumination of an illumination source, such as a dim level, instead of displaying multiple entries in the sequence of past lighting events, a single entry may be displayed. In some examples, if a threshold amount of time (e.g. ten minutes) has passed between two button presses, an additional entry may be displayed in the sequence. Similarly, if a lighting control 106 provides the option to cycle between, for example, different lighting scenes or saved settings, cycling through the scenes may be entered as a single lighting event, rather than a separate lighting event for each option cycled through.

As an option, the user 102 may select which illumination sources 104 to see the ordered sequence of events for by using the user device 108. For example, the user device 108 may show a map or list of different zones or rooms of an environment 100 and the user 102 may select a particular zone. By selecting a particular zone, an ordered sequence of lighting events associated with illumination sources 104 within that zone is displayed. Alternatively, the user 102 may select a particular illumination source 104 by selecting an entry associated with the illumination source 104 from a list of all the illumination sources 104 within the environment 100 or a zone within the environment 100. As another option, the user 102 may select multiple illumination sources 104, e.g. by drawing a box around the illumination sources 104 on a graphical map of the environment 100. An advantage of this is that the user 102 can select to see only the illumination sources 104 that are associated with unexpected or unwanted lighting events.

In some examples, the user 102 can select one or more lighting controls 106 as a way of selecting the set of illumination sources 104. That is, the user 102 can select, for example, a remote wall switch to cause the display screen to show the chronologically ordered sequence of lighting events associated with the illumination sources 104 that are controlled by or have been controlled by the remote wall switch, which could include lighting events triggered by other lighting controls than this particular wall switch. The user device 108 may show a list of lighting controls 106 that can be selected, or in some examples, the display screen may show a map of the environment 100 showing a relative position of the lighting controls 106, e.g. the wall mounted wall-switches within a room of a house. An advantage of allowing the user 102 to select a lighting control 106 to select the illumination sources 104 is that it allows the user 102 to see which lighting events have been caused by a particular lighting control 106.

Another option for selecting the one or more illumination sources 104 is by detecting the desired illumination source(s) or lighting control(s) via the user device 108. For example, the user device 108 may select an illumination source 104 based on the proximity between the user device 108 and said illumination source 104. The proximity may be determined by a near field communication connection between the user device 108 and the illumination source 104. The user device 108 may also or instead have an optical (e.g. visible light or infrared light) sensor for sensing an identifier of an illumination source 104. That is, the illumination source 104 may have a barcode, QR code or the like which is unique to that illumination source 104 within the environment 100. In such an example, the user 102 may scan an identifier of an illumination source 104 (or lighting control 106) with a camera of the user device 108 to select that illumination source 104. Proximity could also be determined based on measured signal strength such as RSSI of a wireless communication connection In another option, the set of illumination sources 104 may be selected based on the most recent event. For example, the display screen may, in response to a user input or automatically, display a chronologically ordered sequence of lighting events associated with the illumination source(s) which have produced the most recent lighting event. That is, if an illumination source 104 undergoes a lighting event (e.g. a change in dim level), the display screen may show a list of past lighting events associated with that particular illumination source 104. This can also apply to lighting controls 106. For example, if a remote control is used to operate an illumination source 104 (e.g. a button is pressed to switch on a table lamp), the display screen may show a sequence of past lighting events associated with that particular lighting control 106. An advantage of this is that the user 102 can see why the most recent lighting event has happened and the changes made to a particular component in the run up to the most recent event.

In some examples, the chronologically ordered sequence is displayed as a graphical timeline on the display screen of the user device 108. The graphical timeline may include graphics of the selected illumination source(s), the lighting control(s) and the attribute(s) and/or trigger associated with the sequence of lighting events. The graphical timeline may also include text accompanying the abovementioned graphics. An advantage of this is that the graphical timeline may allow the user 102 to easily recognize and understand the lighting events from the use of familiar graphics.

The ordered sequence, which may be displayed as a graphical timeline or otherwise, may in some examples show the date and/or the time at which each lighting event occurred. This may include the time at which the lighting event started, and optionally, the time at which the lighting event ended and/or the duration of the lighting event. For example, the displayed sequence may show a first lighting event that occurred at 11 pm on Saturday which lasted for forty five minutes, a second lighting event that occurred at 8 am on Sunday which lasted for twenty minutes and a third lighting event that occurred at 8.20 am on Sunday which lasted for five minutes. An advantage of this is that the user 102 can see exactly when each lighting event occurred. The user 102 can then determine which of the displayed lighting events corresponds to the time at which an unexpected event occurred.

As an optional feature, the display screen may automatically update the chronologically ordered sequence as a lighting event occurs. The update may happen in real time or at least update quickly enough to be perceived as updating in real time. For example, the display screen may indicate that a lighting event has been triggered (e.g. an illumination source 104 has been triggered by an application to gradually reduce the brightness of the emitted illumination, starting at 9 pm). The display screen may also update as the lighting event continues, e.g. by showing the current brightness level of the illumination source 104 in real time. An advantage of this option is that the user 102 can view lighting events as they happen. This allows the user 102 to understand why the lighting event is occurring, for example, by viewing the trigger for the lighting event.

As another optional feature, to modify a lighting event, be it an attribute of the lighting event or a trigger of the lighting event, the user 102 may select the lighting event s/he wishes to modify by using the user device 108. For example, the user 102 may select a graphic from the graphical timeline (e.g. by use of a touch screen) or issue a voice command indicating the lighting event to be modified. Selecting a lighting event may present the user 102 with an option to modify an attribute or the event and/or an option to modify the trigger responsible for causing the lighting event. Depending on the lighting event, upon selecting an event the user 102 may be connected to a third party application or service (e.g. cloud service) that acted as a trigger for the event or programmed the behavior which caused the lighting event. An advantage of this is that the user 102 need only to select a specific lighting event to modify to start the modification process. The user 102 does not have to load a separate application and search for the rule or event programmed in the application to modify the lighting event. Alternatively, the lighting system 200 (or a component thereof) may determine which application is responsible for the event or behavior and link the user to that application, so s/he can modify the behavior accordingly in the responsible application. For example, the responsible application may be loaded on the user device 108.

In some examples, a sequence of past lighting events may be stored in a memory of the user device 108, at one or more servers accessible by the user device 108 or it may even be stored in part at the user device 108 and in part at a server. The server may be implemented at the central bridge 208 referred to above or elsewhere, or a combination. The stored sequence may contain at least the displayed chronologically ordered sequence of past light events. The stored sequence may also contain previous past lighting events that are not displayed on the display screen. For example, the stored sequence may contain some or all of the past lighting events for part or all of the illumination sources 104 within the environment 100 that have occurred within a time frame. The time frame may be one day, one week, one month or longer. The amount of lighting events stored in the sequence may be limited only by the memory of the user device 108. The user device 108 may provide a selectable option to view historical lighting events for a particular set of illumination sources 104, a particular lighting control 106 or a particular zone of the environment 100. In an example, the ordered sequence (and optionally the graphical timeline) may allow the user 102 to view lighting events that occurred days or weeks ago, depending on the stored lighting events.

In further examples, a lighting event may be deleted manually or automatically from the stored sequence. For example, the user 102 may select, via the user interface 202 (e.g. display screen), a past lighting event to delete. In another example, lighting events may be deleted automatically based on the period of time since the lighting event occurred. An advantage of this is that an archive (list or sequence) of past lighting events can be deleted for security purposes. For example, a user 102 may have programmed an application to switch the bedroom lights on every day at 6 pm when the user 102 is away from home. The user 102 may wish to delete these entries if, for example, the user device 108 on which the application was installed is stolen.

Tracking the source responsible for a change (i.e. the trigger responsible for a lighting event) can be done through authorization tokens. Any application or service that wants to access the central bridge 208 to control an illumination source 104 has to request access. Once access is granted it receives a token to make changes to the central bridge 208. For every command that it sends to the bridge 208 it has to include this token (or a derivative thereof) to identify itself. Based on these tokens the lighting system 200 can keep a record of commands that were executed by specific tokens. Also, if the source configures lighting behavior (i.e. lighting events) in the bridge 208, the resulting behavior uses this authorization token. For example, a lighting application can be used to configure the following lighting event: if an "on" button on a switch in the hall way is pressed, two hallway lights are switched on. If the button is pressed, the bridge 208 internally uses the authorization token, that the application has access to, when switching on the hallway lights. The request, grant, and use of authorization tokens may be tracked, logged, stored and deleted automatically or in response to a user input.

Once it is known which application or service, for example, controlled the illumination sources 104, or configured the behavior/lighting event, the user interface can, via the display screen, offer various options to: identify the application or service by showing the name related to an authorization token; revoke the authorization token and with that the access rights of a source on the bridge 208; modify the access rights of that authorization token; if acceptable, remove a specific behavior by deleting an associated resource-link; or go to the relevant behavior configuration screen.

Commands can be linked to the authorization token of the source, e.g. in the case of an automated behavior the creator (source/owner) of the automation is shown. Since a source can create home automation for multiple rooms, buttons, sensors, timers, and so on; only the name of the source may be insufficient information. Showing the internal rules or schedule numbers in the bridge 208 may not help the user 102 either as he/she is not aware of such details. Instead the behavior can be identified by a "container" in the bridge 208 known as a "resource link" which refers to related lighting automation behavior, like the behavior installed for a specific button. This "resource link" can be logged with the source. A resource link and source cannot simply be reconstructed afterwards as the automation behavior might also change over time. Providing both gives the user 102 insight into why something happened and who originally set it up.

Changes in light output can also be caused in different ways not triggered by (or through) the user device 108 or the bridge 208, and thus may not have further information associated to them. E.g. a light might be powered-off and on via a wall switch causing a light output change, a light might have a local control, or it might be controlled via a ZigBee or Bluetooth remote control.

Similarly to the lights, the user 102 might investigate/visualize a timeline for other system components, for example, a light switch. The behavior of the switch may be defined by the rules stored in the bridge 208. A user 102 could link a specific light scene to a button on the switch; however, other sources such as third party apps could create additional rules with another action assigned to the same button press. In this case, if after pressing a light switch the light does not behave as expected by the user 102, the view then lists sources and the resource links for this button, so the user 102 can view all the effects of the button. In addition, similar to the case of the lights, the user 102 can disable the behavior of the source that caused an undesired behavior of the switch. The approach can be used with any other component of the lighting system 200 whose behavior can be programed or influenced by different sources.

The controller 204 and its components as shown in FIG. 2 are represented as a schematic block diagram for the purposes of explaining the functionality of the controller 204 only. Hence, it is understood that each component of the controller 204 is a functional block for performing the functionality ascribed to it herein. Each component may be implemented in hardware, software, firmware, or a combination thereof. Additionally, although described as separate components of the controller 204, some or all of the functionality may be performed by a single piece of hardware, software, or firmware. The controller may also be implemented across a cloud based internet service.

It will be understood that the controller 204, processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a lighting system comprising one or more illumination sources, wherein each illumination source is controllable to emit respective illumination for illuminating an environment, the method comprising:
   causing a user interface of a user device to output an indication of one or more past lighting events associated with a set of the one or more illumination sources by displaying a sequence of one or more past lighting events on a display screen of the user device, the indication comprising one or more attributes of the illumination associated with a respective lighting event from the one or more past lighting events, and a trigger which led to the respective lighting event from the one or more past lighting events,
   enabling a user to modify the trigger which led to the respective lighting event occurring by enabling the user to select, via the user device, one or more lighting events from the displayed sequence of one or more past lighting events.

2. The method according to claim 1, wherein the enabling the user to modify the trigger which led to the respective lighting event occurring comprises preventing the trigger from causing the respective lighting event to occur in the future.

3. The method according to claim 1, wherein the set of the one or more illumination sources is selected by a user via the user device.

4. The method according to claim 3, wherein the selecting of the set of the one or more illumination sources comprises selecting, via the user device, one or more lighting controls responsible for controlling the one or more illumination sources.

5. The method according to claim 1, wherein the set of the one or more illumination sources is selected based on a proximity between the user device and at least one of: (i) the one or more illumination sources and (ii) the lighting control responsible for controlling the one or more illumination sources.

6. The method according to claim 1, the method comprising outputting the indication of the one or more past lighting events as a chronologically ordered sequence of past lighting events forming a graphical timeline displayed on the user interface of the user device.

7. The method according to claim 6, wherein each past lighting event in the chronologically ordered sequence is represented as a respective graphical element on the graphical timeline, and the enabling of the user to select one or more lighting events from the displayed sequence comprises enabling the user to perform said selection by selecting one or more of the respective graphical elements.

8. The method according to claim 1, wherein the indication comprises a date and/or time associated with each respective past lighting event.

9. The method according to claim 1, wherein the indication is automatically updated as lighting events associated with the set of the one or more illumination sources occur.

10. The method according to claim 1, the method comprising storing a sequence of past lighting events associated with the set of the one or more illumination sources.

11. A computer program product comprising computer program code embodied on a computer-readable storage medium, wherein the computer program code is configured to cause at least one processor to perform the method of claim 1 when the processor runs the computer program code.

12. An apparatus for controlling a lighting system comprising one or more illumination sources, wherein each illumination source is controllable to emit respective illumination for illuminating an environment, the apparatus comprising:
    a user interface configured to output an indication of one or more past lighting events associated with a set of the one or more illumination sources, by displaying a sequence of one or more past lighting events on a display screen of a user device, wherein the indication comprises one or more attributes of the illumination associated with a respective lighting event from the one or more past lighting events, and a trigger which led to the respective lighting event from the one or more past lighting events; and
wherein the user interface is further configured for enabling a user to modify the trigger which led to the respective lighting event occurring by enabling the user to select, via the user device, one or more lighting events from the displayed sequence of one or more past lighting events.

* * * * *